United States Patent [19]

Hicks

[11] 4,274,551
[45] Jun. 23, 1981

[54] DISPENSING APPARATUS HAVING CONTINUOUSLY DRIVEN CONVEYOR

[76] Inventor: Kevin J. Hicks, 36 Northarm Rd., Middle Cove, New South Wales, Australia

[21] Appl. No.: 915,432

[22] Filed: Jun. 14, 1978

[51] Int. Cl.³ ............................................. A47F 3/02
[52] U.S. Cl. ................................ 221/78; 221/150 R; 221/155; 221/234; 221/236; 221/196
[58] Field of Search ........ 221/150 R, 150 HC, 150 A, 221/150 B, 155, 225, 234, 233, 236, 195, 196, 14, 78, 80, 268; 99/357; 198/357, 358

[56] References Cited

U.S. PATENT DOCUMENTS

| | | | |
|---|---|---|---|
| 2,173,952 | 9/1939 | Ranney | 198/358 |
| 3,061,147 | 10/1962 | Vilmerding | 221/268 |
| 3,391,633 | 7/1968 | Boosalis | 221/150 HC |
| 4,010,841 | 3/1977 | Bonzack | 198/357 |
| 4,034,661 | 7/1977 | Boosalis | 221/150 A |

Primary Examiner—Allen N. Knowles
Attorney, Agent, or Firm—Ladas & Parry

[57] ABSTRACT

An apparatus for dispensing articles, particularly, but not necessarily, packaged food articles which are warmed within the apparatus. The apparatus comprises a storage zone, a dispensing zone and a conveyor for conveying articles between the storage zone and the dispensing zone. Articles are loaded into vacant holders in a loading zone and such loading is controlled by a detector which detects for the presence of articles in holders which are at any one time approaching the loading zone. A further detector detects for a vacancy in the dispensing zone and, if such vacancy exists, an article is transferred from an associated holder to the dispensing zone.

11 Claims, 8 Drawing Figures

DISPENSING APPARATUS HAVING CONTINUOUSLY DRIVEN CONVEYOR

FIELD OF THE INVENTION

This invention relates to a commodity dispensing apparatus and more particularly, but not exclusively, to an apparatus for dispensing packets of food at a selected temperature at a point of sale.

For convenience of reference, the invention is hereafter described in the context of an apparatus for use in dispensing warmed biscuits or cookies. However, it is to be understood that the apparatus may equally be used for dispensing other commodities, be they food lines or otherwise, at ambient temperature or above or below ambient temperature.

BACKGROUND OF THE INVENTION

In the food retailing industry, it is desirable that such products as biscuits or cookies be stored and be made available to customers under heated conditions. This for two reasons. Firstly, a warmed product gives the impression of being "oven-fresh" and this invites greater customer appeal. Secondly, and more importantly, heating of the product causes absorbed moisture to be driven from the product and results in crisper and fresher-tasting products being made available to a customer. This applies also to those products that are customarily packaged in transparent cellophane and similar plastics material wraps. It has been found that the very thin plastic sheet material that is used for packaging such food products as biscuits and cookies is porous to moisture and that ambient moisture is absorbed by the packaged product.

Similarly, it is desirable that other types of food products be stored and be made available to customers at temperatures below ambient.

OBJECT OF THE INVENTION

The present invention seeks to provide an apparatus in which temperature control may be maintained, if required, and which in any case provides for convenient commodity storage and point of sale dispensing. The apparatus provides for customer self-service and does not require the attention of selling personnel other than for loading the apparatus.

SUMMARY OF THE INVENTION

Thus, the present invention provides an article dispensing apparatus comprising a storage zone for receiving articles which are to be dispensed from the apparatus, and a conveyor for conveying the articles to be dispensed. The conveyor has holders distributed along its length for conveying the article throughout the apparatus. Means are provided for driving the conveyor past the storage zone and past a dispensing zone into which a said article can be moved from a said holder and from which the article can be removed. A loading zone is provided within the apparatus and at which an article from the storage zone can be loaded into a vacant said holder, and a first detection device is provided for detecting whether a holder which is at any one time approaching the loading zone is vacant. A loading device which is operable responsive to detection of a vacant holder is provided to effect loading of an article into the vacant holder in the loading zone. A second detection device is incorporated in the apparatus to detect for the presence of a vacancy in the dispense zone, and a transfer device which is operable responsive to detection of such a vacancy is provided to effect transfer of an article from a holder and into the dispensing zone.

PREFERRED FEATURES OF THE INVENTION

In accordance with a preferred aspect of the invention, the apparatus as above defined incorporates a temperature control device together with means for regulating the temperature of such device. When heating of the articles is required, the temperature control device may comprise one or more heating elements and, preferably, a blower to aid convection currents within a cabinet housing the apparatus. In applications requiring cooling of articles within the apparatus, the temperature control may comprise a refrigeration plant.

The dispensing zone preferably comprises an inclined surface or ramp which projects forwardly of the conveyor path and along which the articles slide when they are transferred from the associated holders to a vacant space in the dispensing zone. The apparatus would normally be housed within a cabinet and the dispensing zone is preferably partly covered by a transparent cover so that a prospective purchaser may view available articles. For the same reason, a portion of the cabinet wall above the dispensing zone is preferably formed from a transparent material panel so that articles carried by holders and which are approaching the dispensing zone may be viewed.

A lip is provided at the forwardmost edge of the dispensing zone for retaining articles on the ramp, and the dispensing zone is preferably sized to accommodate a plurality of banked-up articles. When the apparatus incorporates heating or cooling, the dispensing zone is preferably arranged to be influenced by the heating or cooling effect. When provided, the cover for the dispensing zone includes an opening so that customers may remove articles from the dispensing zone. However, the opening may itself be covered with a flap, or retrieval of articles from the dispensing zone may be made by way of a coin-freed mechanism.

As one article is removed from the dispensing zone it will leave a vacancy which may be filled with another article being transferred from a holder associated with the conveyor. Most preferably, the conveyor mechanism does not enter the dispensing zone, and the mechanics of the apparatus are concealed from persons by the cabinet structure.

The apparatus in accordance with the invention may provide for two or more parallel streams of articles to be carried by the conveyor. When transferred from the holders, articles from the respective streams lie side by side in the dispensing zone. With this structure, a double output may be obtained in respect of a single type of article, or different type of articles may be loaded into the respective streams from respective storage zones.

The conveyor preferably comprises a pair of spaced-apart parallel endless chains which are bridged by and which carry the holders. The holders would normally comprise trays. Most preferably, the conveyor moves continuously, in operation of the apparatus, and loading/unloading of the articles to and from the holders is effected whilst the conveyor is moving. When two or more parallel streams of articles are conveyed through the apparatus, a single conveyor system is preferably still used, and the articles are carried upon trays which have a width appropriate to the number of required streams. However, it would in this case be necessary to have loading and unloading detectors (i.e. the first and second detectors referred to above) associated with each of the streams, to accommodate the situation where more articles are dispensed from one of the streams than the other(s).

The invention will be more fully understood from the following description of a preferred embodiment of an apparatus for use in dispensing packeted biscuits or cookies, a plurality of the biscuit or cookies being located in each packet. The description is given with reference to the accompanying drawings.

DESCRIPTION OF PREFERRED EMBODIMENT

Figure 1:
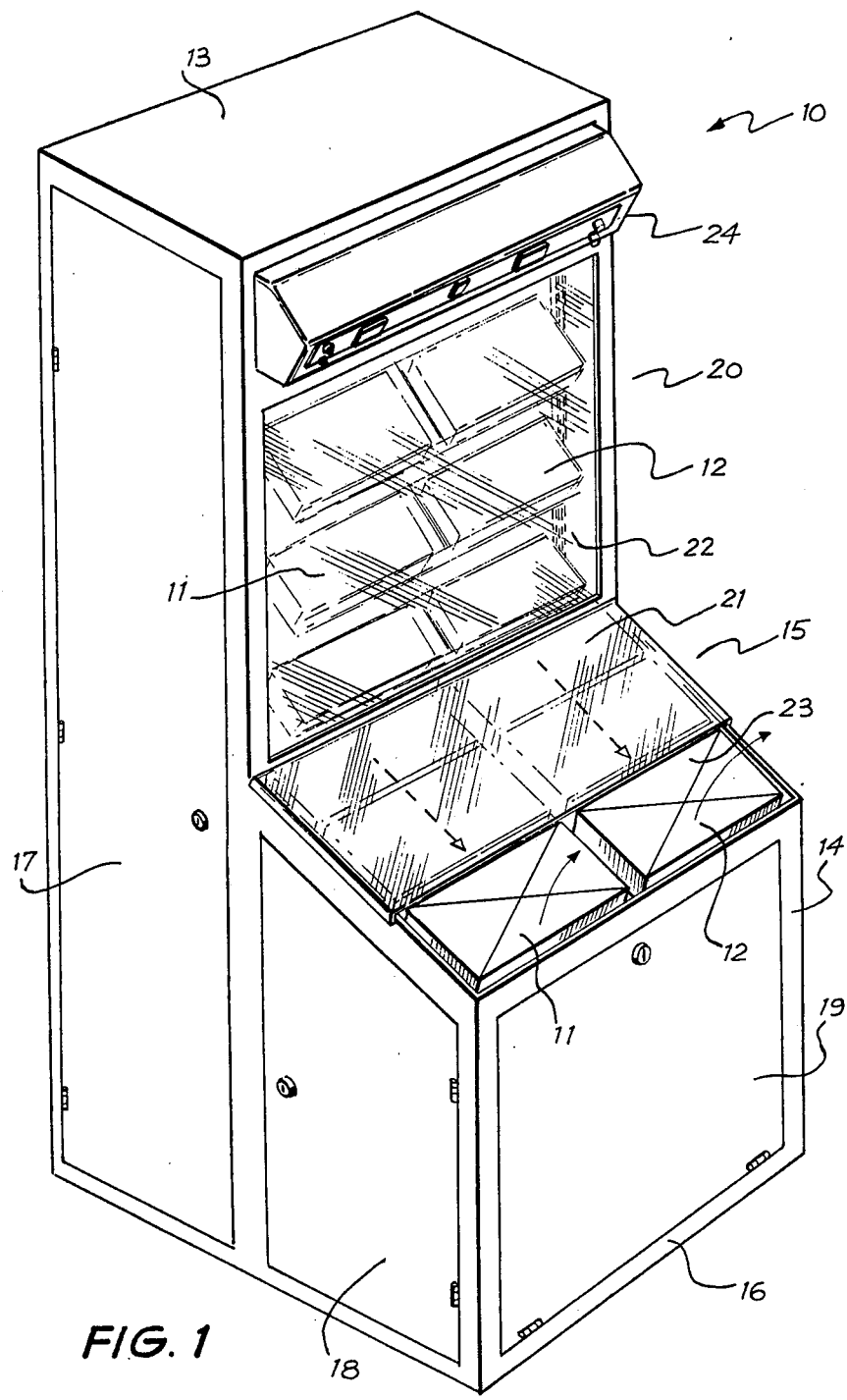
FIG. 1 shows a perspective view of the apparatus.

As shown in FIG. 1, the package dispenser comprises a cabinet 10 in which two streams of packages 11 and 12 are stored, conveyed and exhibited, and from which the packages may be manually dispensed or extracted. The cabinet includes two integral portions 13 and 14, the first (13) of which includes package storage zones and the other (14) of which incorporates a dispensing zone 15 and a lower drive mechanism cabinet 16. Side entry doors 17 and 18 are provided at both sides of the cabinet and a front entry door 19 is provided at the front portion of the cabinet below the dispensing zone 15. A rear entry door or removable panel (not shown) is also provided at the back of the cabinet.

Two display areas are provided in the cabinet, one of which being the dispensing zone 15 and the other being a vertical face 20 above the dispensing zone. Both of these display areas are covered by transparent panels 21 and 22. The transparent panel 21 is provided with an opening 23 through which the packages 11 or 12 may be removed from the dispensing zone 15.

Above the vertical face 20 of the cabinet is a control panel 24 which incorporates switches, controllers and indicator lamps which are referred to later.

In operation of the dispensing apparatus, the two streams of packages 11 and 12 are continuously conveyed through the cabinet until such time as a vacancy is created in the dispensing zone 15 as a result of a person taking one or more of the packages 11 or 12 from the dispensing zone. Thereafter, a new package is transferred from the main conveyor system into the dispensing zone, and the package transferred from the conveyor system is replaced with another from a storage zone within the cabinet. This operation is described in greater detail below, with reference to FIGS. 2 to 8 of the drawings.

Figure 2:
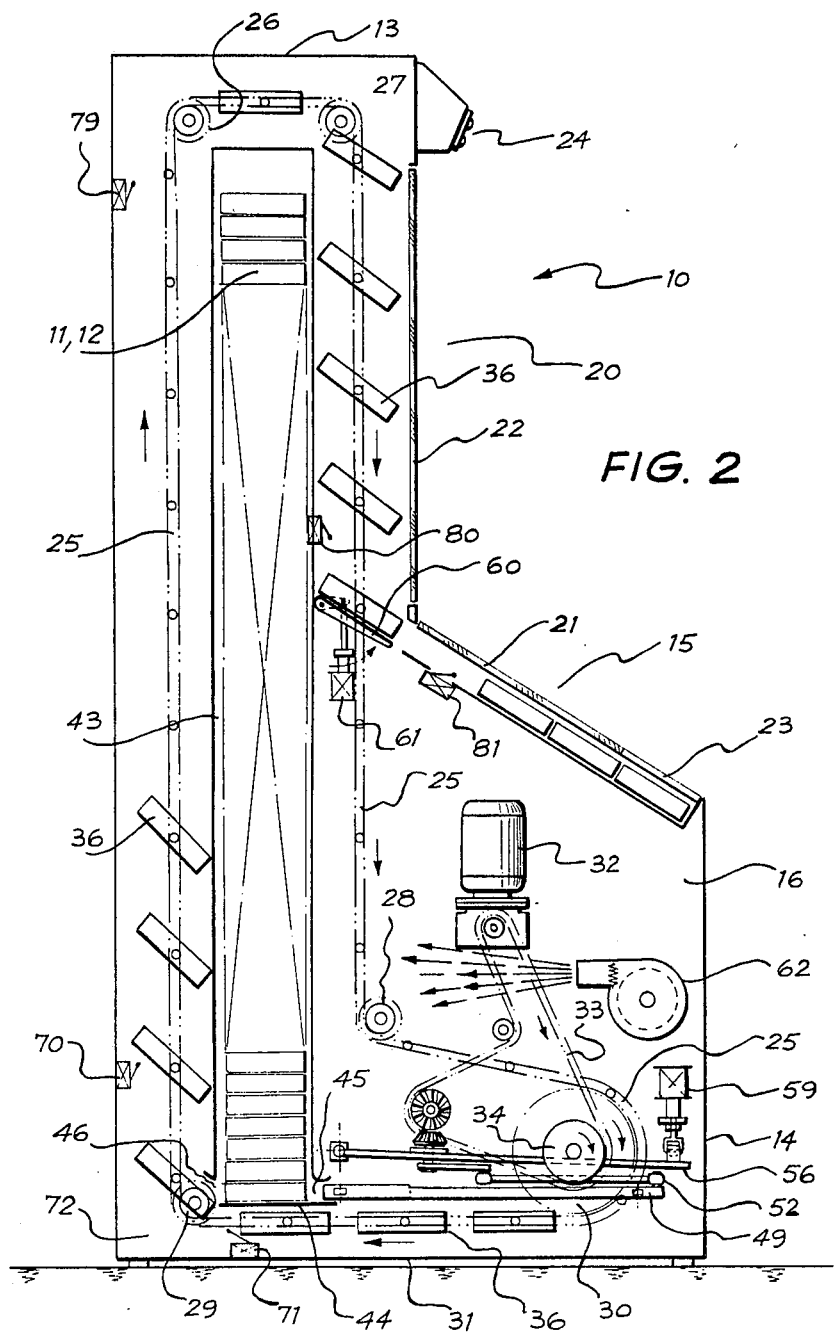
FIG. 2 shows a side elevation view of the apparatus with side covers of a cabinet thereof removed.

Within the cabinet portions 13 and 14 are two conveyor chains 25, one of which is behind the other as viewed in the direction of FIG. 2. The conveyor chains are spaced apart by almost the full width of the cabinet, they run parallel with each other and they extend around respective sets of axle-mounted idler sprockets 26 to 29. The conveyor chains 25 also extend around respective drive gear wheels 30. Each of the conveyor chains is endless and moves up the rear of the cabinet portion 13, across the top of the same cabinet portion, down the front face 20 of the cabinet portion 13, into the cabinet portion 14 and then across the bottom 31 of the cabinet. A continuous drive is imparted to the conveyor chains 25 by a geared motor 32 by way of a driving chain 33. The driving chain 33 engages with a driving sprocket 34 which is fixed to the gear wheel 30.

The driving chain 33 also engages with a driven sprocket 35 (see FIG. 3) which is fixed to a loading mechanism drive which is referred to below.

Figure 6:
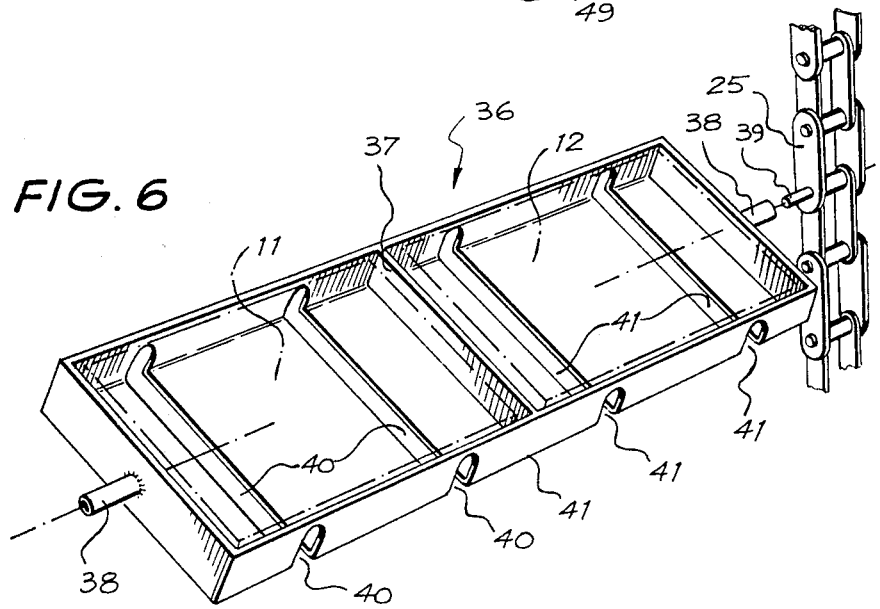
FIG. 6 shows a perspective view of one of a number of holders for supporting and conveying the biscuit or cookie packets throughout the apparatus.

The two conveyor chains 25 are bridged by and support a series of holders 36 which are distributed along the extent of the conveyor chains and which are transported through the cabinet portions 13 and 14 by the conveyor chains. The holders, one of which is shown in FIG. 6, are pivotably mounted to the spaced-apart conveyor chains 25 so that they may turn at various points during their conveyance through the cabinet. The holders 36 would normally be located at equi-spaced intervals along the extent of the conveyor chains 25 but some of the holders are omitted from the arrangement shown in FIG. 2.

Figure 3:
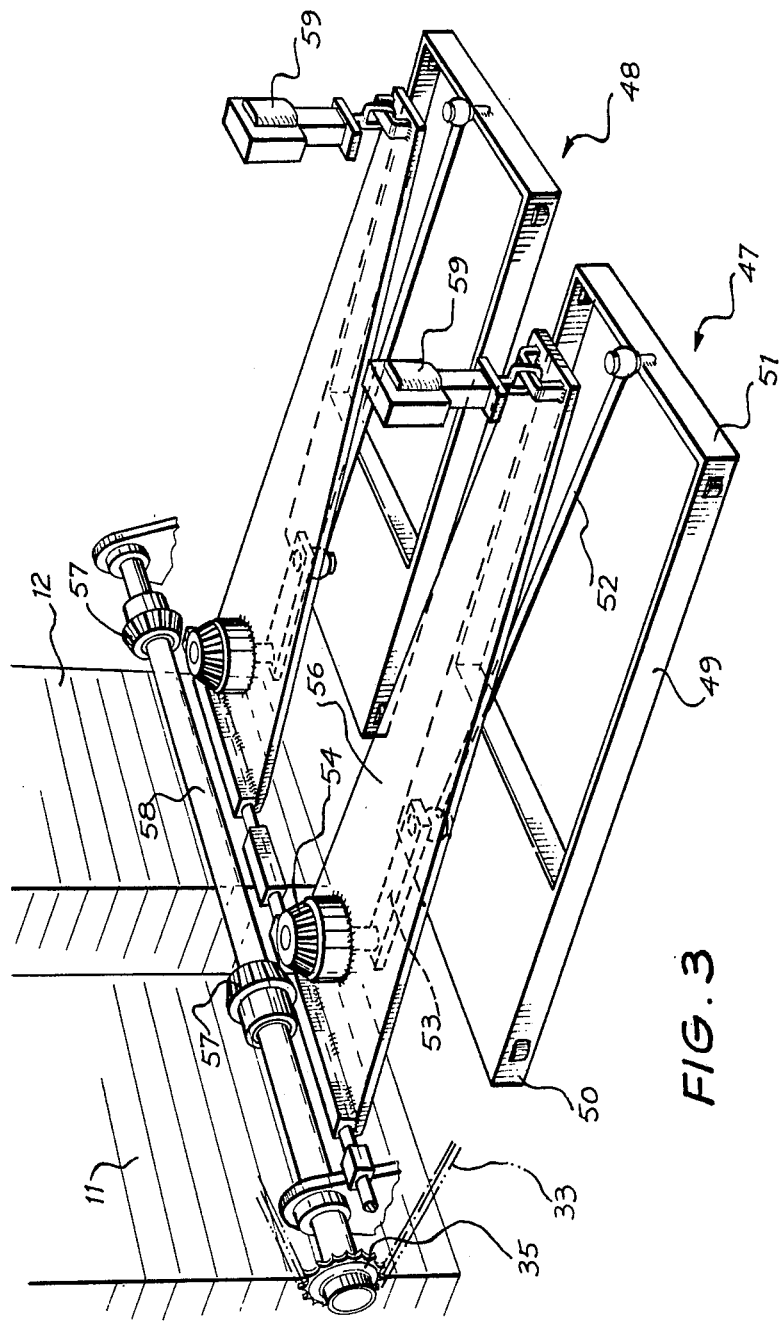
FIG. 3 shows, in perspective, a portion of a loading mechanism of the apparatus, such mechanism being shown isolated from associated parts of the apparatus.

Each holder, as shown in FIG. 3 comprises an open-topped tray which is sufficiently wide to hold two of the packages 11 and 12, and the holder is provided with a central partition 37 to separate the two packages. A hollow spigot 38 is located at each end of the holder and it is arranged to receive an inwardly projecting pivot pin portion 39 of an adjacent one of the conveyor chains 25.

Two slots 40 and 41 are located in the base 42 of the holder at each side of the partition 37, the slots being located below the packages 11 and 12 and being provided for a reason to be hereinafter stated.

A walled compartment 43 is located within the cabinet portion 13 and it defines a storage zone for packages 11, 12 which are to be loaded into vacant ones of the holders 36. The compartment 43 extends for almost the full width of the cabinet and, although not so shown in the drawings, is subdivided into two compartments for respective stacks of the packages 11 and 12. The compartment 43 has side access openings, which lie in planes parallel to the doors 17 (see FIG. 1) to permit stacking of packages into the compartment.

A floor 44 is located at the base of the compartment 43 and upon which the lowermost one of a stack of the packages 11, 12 sits. Also, openings 45 and 46 are provided in the walls of the compartment 43 adjacent the floor 44, to permit loading of a stored package into a vacant holder.

Thus, a loading zone exists in the bottom of the cabinet portion 13 and in which the packages are loaded one-by-one into successive vacant ones of the holders 36. In this loading zone, the lowermost one of the stack of packages is pushed from the stack and into a vacant holder 36 during the time that the holder is being conveyed through the loading zone.

Figure 4:
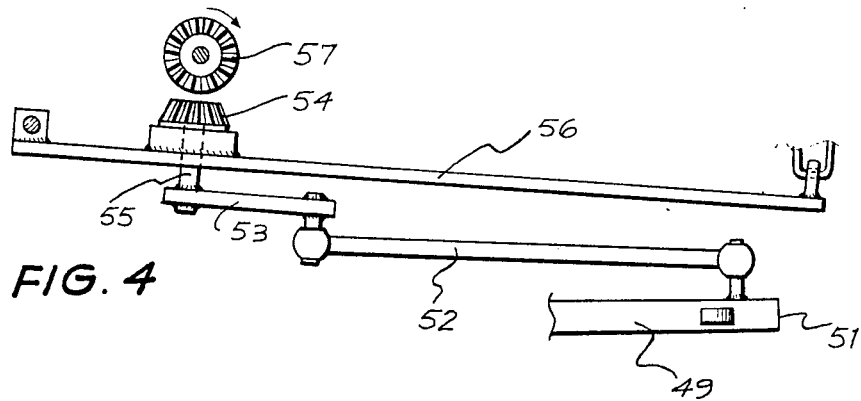
FIG. 4 shows a side elevation view of a portion of the loading mechanism as illustrated in FIG. 3, the mechanism being shown in a non-operational condition.
Figure 5:
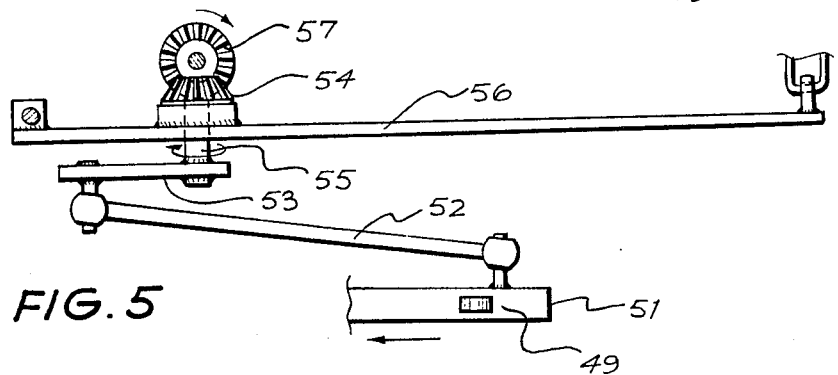
FIG. 5 shows a view of the mechanism as shown also in FIG. 4, but with the mechanism in an operative condition.

As is best seen from FIGS. 3 to 5, two parallel and similar loading mechanisms 47 and 48 are used for this purpose, one mechanism being operable on the stack of packages 11 and the other being operable on the stack 12. Both of the loading mechanisms 47 and 48 operate in the same way, although not necessarily together since packages from one stack only may need to be loaded at any one point in time.

Each of the loading mechanisms 47 and 48, as shown in FIGS. 3 to 5, comprises a pusher carriage 49 which is slidable in side rails (not shown) between a retracted and a forward position. When in the forward position the leading end 50 of the carriage projects through the opening 45 of the stack compartment 43 and acts to expel the lowermost package from the stack.

The trailing end 51 of the carriage is connected by way of a motion translating arm 52 to a crank arm 53, and the crank arm is in turn connected to a driven bevel gear 54 by way of a shaft 55. The bevel gear 54 is bearing mounted to a supporting plate 56 which is pivotable in an upward direction to effect meshing engagement between the driven bevel gear 54 and a driving bevel gear 57. The driving bevel gear 57 is mounted to a shaft 58, to which the previously mentioned sprocket 35 is coupled. The driving bevel gear 57 rotates continuously due to drive imparted from the motor 32.

In operation of the loading mechanism, the plate 56 is pivoted upwardly to cause meshing engagement of the bevel gears 54 and 57, and the crank arm 53 is thereby caused to turn through one revolution. This in turn causes the pusher carriage 49 to move forward, as shown in FIG. 5, and then return to the starting position shown in FIG. 4. To accommodate translation of the rotary motion of the crank arm to linear motion of the carriage, the motion translating arm 52 is fitted at its respective ends with ball joints.

Pivoting of the plate 56 is effected by way of a solenoid 59, the control of which is hereinafter described.

Two groups of two fingers 60 (see FIG. 2) are pivotably mounted behind the vertical panel 20 of the cabinet and are actuable to effect transfer of a package 11 or 12 from its holder 36 into the dispensing zone 15. Respective fingers 60 of each pair are positioned so as to correspond with the slots 40 and 41 (see FIG. 6) in the package holders 36. Thus, when pivoted in an upward direction in the manner shown in FIG. 2, the fingers 60 act to lift the package 11 or 12 from its holder and the package then slides into the dispensing zone 15.

The fingers 60 are actuated by a solenoid 61 and associated lever arm, the solenoid being energized in a manner to be described below. One solenoid and one pair of fingers 60 is associated with each stream of packages and holders 36. The solenoids and lever arms (but not the fingers) are located adjacent the respective side walls of the cabinet so as not to interfere with passage of the holders 36.

As is most clearly seen from FIG. 2, the holders 36 are tilted during most of the extent of their conveyance through the apparatus. This is for two reasons. Firstly, it permits a slightly more slender construction of cabinet than would otherwise be necessary, and secondly it permits display of packages within the holders which are at any one time to be seen through the front panel 22 of the cabinet.

A heater/blower unit 62 is located in the lower cabinet portion 16, and this unit acts to heat all air spaces within the cabinet. Warm air movement throughout the cabinet is induced by the blower and also by the pumping action of the holders 36 as they move through the cabinet.

Figure 7:
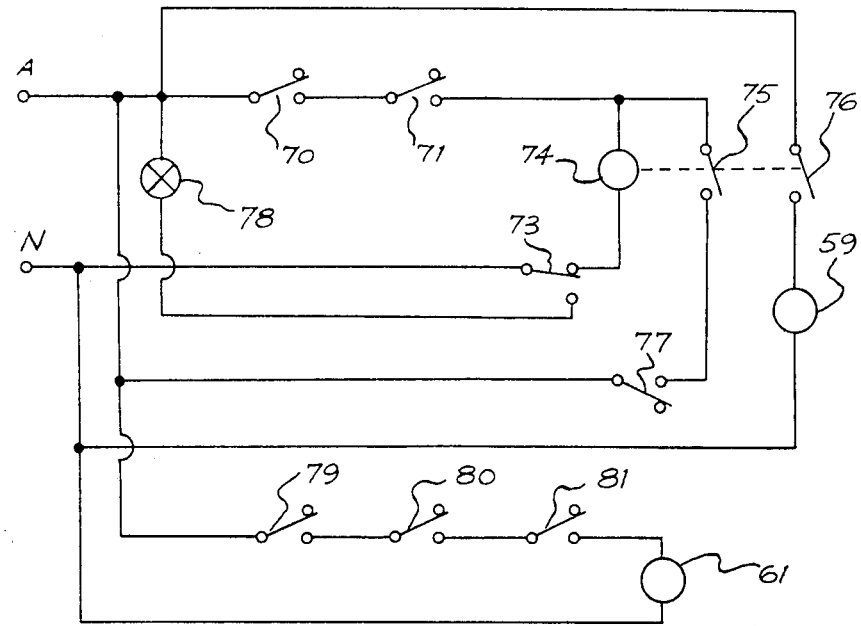
FIG. 7 shows an electrical circuit appropriate to a control system for the conveyor mechanism of the apparatus.
Figure 8:
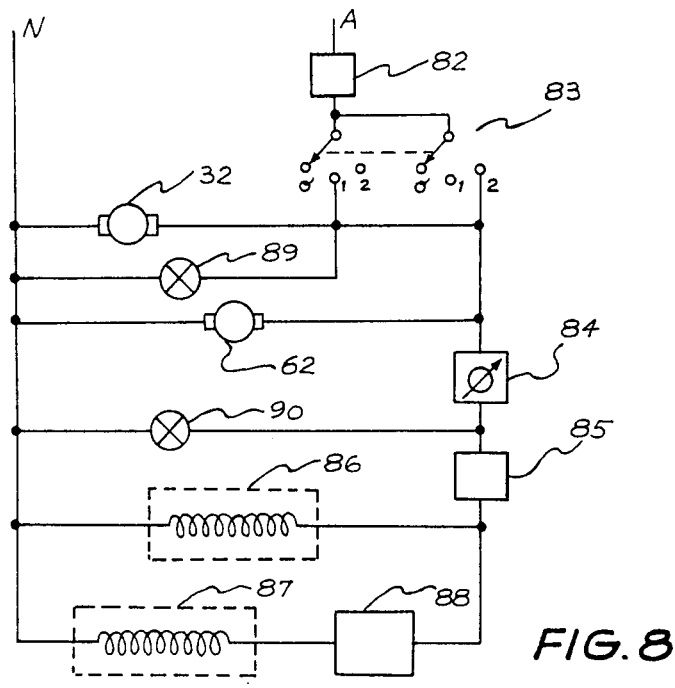
FIG. 8 shows an electrical circuit appropriate to heater and motor controls associated with the apparatus.

The operation of the apparatus has been described in part in the preceding portion of this specification. The operation is now further described with reference to the circuit diagrams of FIGS. 7 and 8. FIG. 7 shows electrical connections that are relevant to automatic loading of vacant package holders and automatic transfer of packages from the holders into vacant sites in the dispensing zone. FIG. 8 shows electrical connections that are applicable to the conveyor motor and heaters.

Referring firstly to FIG. 7 and to FIG. 2, which shows the position of some of the switches of FIG. 7. A first area switch 70 is located near the bottom of the cabinet portion 13 and acts to sense the position of successive ones of the holders 36 as they progress through the apparatus. Also, a package-present switch 71 is located adjacent the loading zone 72 of the apparatus and acts to sense whether a package is carried by a holder which is at any one time about to enter the loading zone. This package-present switch senses the presence of a package by having its contact arm positioned to project through the slots 40 or 41 in the holders. Furthermore, a storage zone switch 73 is located adjacent the bottom of the compartment 43 and serves to sense if the compartment is not holding any packages in store.

If a holder which is entering the loading zone is not carrying a package, switch 71 closes. Also, when a holder is in the appropriate position, switch 70 closes to act as a synchronizing switch. Then, if at least one package is present in the storage zone the switch 73 will be closed, and a relay 74 will be energized. Energization of the relay causes relay contacts 75 and 76 to close.

With closure of contact 76, a solenoid 59 (see FIG. 3) is energized and the loading mechanism is operated to cause loading of a package from the storage zone into the vacant holder. During this period the holder continues to be moved by the conveyor chains 25.

A latching switch 77 is located adjacent the carriage 47 (see FIG. 3) and is held open when the carriage is in the retracted position in FIG. 4. However, when the carriage moves forward to effect loading of the vacant holder, the switch 77 closes to sustain energization of the relay 74, until the carriage returns again to its retracted position. This latching is necessary because of the continuous movement of the holders during the loading operation.

Once the carriage has returned to its rest position, the latching switch 77 opens and the relay 74 de-energizes. This in turn causes de-energization of the solenoid 59.

If the storage zone is free of stored packages, the switch 73 will open to prevent energization of the relay 74 and, by opening, causes a refill-necessary lamp 78 to light.

A similar switching function occurs adjacent the dispensing zone 15, where packages are to be transferred to a vacant spot in the dispensing zone from a holder.

A second area switch 79 is located adjacent the upper end of the cabinet portion 13 and it acts to sense the position of successive ones of the holders as they progress towards the dispensing zone and to synchronize the dispensing operation. Also, a package-present sensing switch 80 is located just before the dispensing zone and acts to detect for the presence of a package in a holder approaching the dispensing zone in the same manner as the switch 71. Finally, a package-present switch 81 is located in the dispensing zone and acts to detect whether any vacancy exists within the dispensing zone.

If a vacancy does exist in the dispensing zone and a holder approaching such zone is occupied by a package, all switches 79, 80 and 81 close to cause energization of the solenoid 61. This, as abovementioned, causes actuation of the transfer fingers 60 and the package is transferred from its holder and into the dispensing zone. Thereafter, the vacated holder will be filled with a new package as it next enters the loading zone 72.

A portion of the circuitry shown in FIG. 7 is duplicated so that the two streams of packages 11 and 12 may be loaded and be transferred independently of one another. However, it is to be understood that both streams are conveyed continuously, regardless of any loading/transferring functions.

Referring now to the circuit diagram of FIG. 8. This includes an over-current switch which functions solely as a protective device. A double-gang, three-position switch 83 is located in the circuit and is used for switching either the conveyor motor 32 alone, or the conveyor motor together with heater controls. The heater controls include the blower motor 62 (referred to previously), a temperature selector/controller 84, thermal-overload relay 85 and two heater elements 86 and 87. The heater elements are associated with the blower 62 and one of them is independently controlled by a simmerstate device 88.

Circuit condition indicator lamps 89 and 90 are also provided.

The various control switches, indicator lamps and temperature regulator as shown in FIG. 8 are mounted on the console 24 of the cabinet, together with the indicator lamp 78 as shown in FIG. 7.

I claim:

1. An article dispensing apparatus comprising a storage zone for receiving articles which are to be dispensed, a conveyor having distributed along its length holders for conveying the articles through the apparatus, means for continuously driving the conveyor past the storage zone and past a dispensing zone into which a said article can be moved from a said holder and from which the article can be removed, a loading zone at which an article from the storage zone can be loaded into a vacant said holder, first detection means for detecting whether a holder which is at any one time approaching the loading zone is vacant, loading means operable responsive to detection of a vacant holder to effect loading of an article into the vacant holder in the loading zone whilst the conveyor continues to move, second detection means for detecting the presence of a vacancy in the dispensing zone, transfer means operable responsive to detection of a vacancy within the dispensing zone to effect transfer of an article from a holder and into the dispensing zone whilst the conveyor continues to move, and means for rendering the transfer means inoperable if a vacancy is not detected in the dispensing zone by the second detection means, whereby an article which otherwise would be transferred into the dispensing zone from a holder is recycled through the apparatus.

2. An apparatus as claimed in claim 1 and including further detection means for sensing the presence of an article in a holder which is at any one time approaching the dispensing zone, the transfer means being operable only if the presence of a said article within an associated holder is so sensed.

3. An apparatus as claimed in claim 1 and including a cabinet housing all but the dispensing zone, and means for controlling the temperature within the cabinet.

4. An apparatus as claimed in claim 3 wherein the temperature control means includes at least one heating element.

5. An apparatus as claimed in claim 3, wherein the cabinet includes two portions, a first one of which houses the storage zone and the loading zone and the second of which projects ahead of the first portion and has a surface thereof constituting said dispensing zone.

6. An apparatus as claimed in claim 5, wherein the dispensing zone is in the form of a covered ramp surface.

7. An apparatus as claimed in claim 1, wherein the conveyor comprises a pair of spaced-apart endless conveyor elements between which the holders are suspended, the holders being in the form of open-topped recepticles and being pivotably mounted at each end thereof to an adjacent said conveyor element.

8. An apparatus as claimed in claim 1, wherein the loading means comprises a carriage which is actuable to push a lowermost said article from a stack of articles within the storage zone and into a vacant said holder which is at any one time moving through the loading zone.

9. An apparatus as claimed in claim 8, wherein the transfer means comprises at least one finger which is actuable to pass through a slot in the base of said holders and to move an article from its holder as the holder passes the dispensing zone.

10. An apparatus as claimed in claim 9, wherein the first and second detection means comprise electric switch devices which are located in circuit with first and second solenoid operated actuators respectively, the first actuator being operable to cause engagement of a drive for the carriage and the second actuator being operable to cause actuation of the finger.

11. An apparatus as claimed in claim 1 wherein the means for rendering the transfer means inoperable includes the second detection means.

* * * * *